United States Patent [19]
Grudzien, Jr.

[11] Patent Number: 5,127,269
[45] Date of Patent: Jul. 7, 1992

[54] OPTICAL PRESSURE TRANSDUCER

[75] Inventor: Christopher P. Grudzien, Jr., Mansfield, Mass.

[73] Assignee: Dynisco, Inc., Sharon, Mass.

[21] Appl. No.: 517,827

[22] Filed: May 2, 1990

[51] Int. Cl.⁵ ............................................. G01L 9/00
[52] U.S. Cl. ................................. 73/705; 29/595; 73/723; 250/231.19
[58] Field of Search .................. 73/705, 723, 715; 250/231.19; 29/595

[56] References Cited

U.S. PATENT DOCUMENTS

| | | | |
|---|---|---|---|
| 3,249,760 | 5/1966 | Miller | 250/231.19 |
| 4,727,730 | 3/1988 | Boiarski et al. | 73/705 |
| 4,805,630 | 7/1989 | Storey | 73/705 |
| 4,942,766 | 7/1990 | Greenwood et al. | 73/705 |

Primary Examiner—Donald O. Woodiel
Attorney, Agent, or Firm—Wolf, Greenfield & Sacks

[57] ABSTRACT

An optical pressure transducer employing input and output optical fibers defining therebetween an optical path. The optical path is interrupted by a fixed reflector and a moveable reflector. The moveable reflector is secured by adjustment means to the diaphragm that is responsive to pressure being measured.

50 Claims, 6 Drawing Sheets

PRESSURE

PRESSURE

OPTICAL PRESSURE TRANSDUCER

BACKGROUND OF THE INVENTION

1. Field of the Invention

The present invention relates in general to pressure transducers and pertains, more particularly, to a pressure transducer that is adapted to sense pressure by optical means.

2. Background Discussion The assignee of the present application presently manufacturers and sells melt pressure transducers that are covered by one or more of the following United States patents:

| U.S. Pat. No. | Issued |
| --- | --- |
| 3,349,623 | October 31, 1967 |
| 3,678,753 | July 25, 1972 |
| 4,680,972 | July 21, 1987 |
| 4,679,438 | July 14, 1987 |
| 4,702,113 | October 27, 1987 |
| 4,712,430 | December 15, 1987 |
| 4,829,827 | May 16, 1989 |
| 4,819,487 | April 11, 1989 |
| 4,858,471 | August 22, 1989 |

For the most part, these pressure transducer constructions use a liquid metal filled capillary system. A typical fill material is mercury. For some applications, particularly where toxicity could be critical, mercury filled pressure transducers may be considered somewhat unsafe in operation.

Accordingly, it is an object of the present invention to provide an alternative pressure sensor construction which eliminates the need for a liquid metal filled capillary system and which is yet able to operate in harsh, high temperature/pressure working environments.

Another object of the present invention is to provide an optical pressure transducer which permits the signal conditioning electronics to be disposed remote to the working environment without loss of signal integrity.

A further object of the present invention is to provide an improved optical pressure transducer that can be constructed in relatively small size, particularly adapted for essential retrofit in a standard melt pressure transducer framework.

SUMMARY OF THE INVENTION

To accomplish the foregoing and other objects, features and advantages of the invention, there is provided an optical pressure transducer that includes a body for supporting therein both an input optical fiber as well as an output optical fiber. The input and output optical fibers are preferably disposed in relative juxtaposition with their sensing ends preferably disposed in a common plane and defining therebetween an optical path. A force responsive diaphragm is secured to the body at a position essentially adjacent to the ends of the optical fibers. A fixed position reflector is disposed in the optical path defined between the input and output optical fibers. A moveable reflector is also provided. This is secured to the diaphragm to be responsive to deflection thereof. The moveable reflector is also positioned in the optical path between the input and output optical fibers.

In accordance with further features of the present invention, the fixed reflector is constructed so that it has a reflecting surface essentially in line with the axis of the output optical fiber. Similarly, the moveable reflector has a reflecting surface that is substantially in line with the axis of the input optical fiber. The fixed and moveable reflectors are essentially disposed at a relative right angle to each other. The moveable reflector is preferably supported at about the central axis of the diaphragm and is supported by means of an adjusting member. A light source establishes an optical signal in the input optical fiber, while an optical detector detects an optical signal from the output optical fiber. Means are provided, preferably in the form of an aperture plate for defining predetermined optical restricting apertures of the respective fibers. The aperture plate is secured to the face of the body at the aforementioned common plane. There is also provided a reflector plate disposed over the aperture plate and having metal pieces defining the fixed and moveable reflectors. The reflector plate preferably also includes S-shaped flexures interconnecting the moveable reflector and the fixed periphery of the reflector plate.

In an alternate embodiment of the invention described herein, the input optical fiber is divided to form a bifurcated separate optical fiber. This separate optical fiber carries a portion of the input (unmodified) intensity pattern to a fixed surface of the body of the transducer. The light is reflected from this surface into a second reference output optical fiber. This arrangement is for providing feedback to the conditioning electronics to minimize signal errors externally induced by microbending of the optical fibers as well as temperature induced dimensional changes associated with the transducer body.

In another embodiment of the present invention disclosed herein, the input optical fiber is also divided to form a bifurcated input/output optical fiber. This fiber carries a portion of the unmodified intensity pattern from the light source directly to a second photosensitive device. This arrangement provides feedback to the conditioning electronics to minimize signal errors due to light source drift with time/temperature and photosensitive device thermal effects.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Reference has been made herein before to several earlier patents of the assignee of the present invention. These melt pressure transducer constructions generally employ an elongated frame and in the past when using a filled capillary system, a diaphragm or coupler is employed at the snout end of the frame and a sensing head appear at the opposite end of the frame. The sensing head may employ strain gages or the like for essentially converting a sensed pressure into an electrical signal.

Now, in accordance with the present invention as illustrated herein, a deflection at the diaphragm is sensed optically and this, thus, allows the sensing electronics to be remote from the working environment, or in other words, the place where the diaphragm or coupler is arranged.

Figure 1:
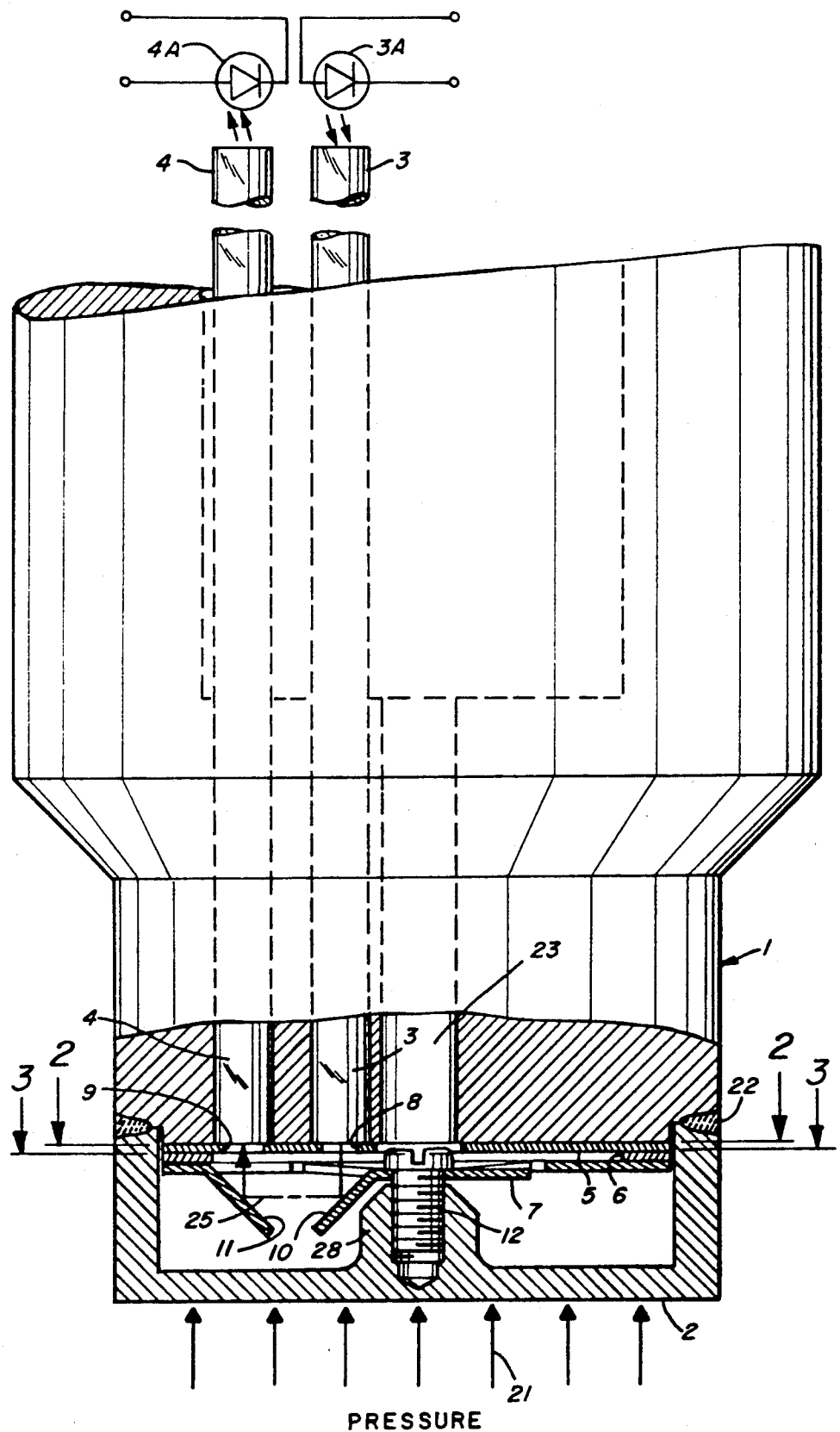
FIG. 1 is a partial sectional view of the optical pressure transducer of the present invention.
Figure 2:
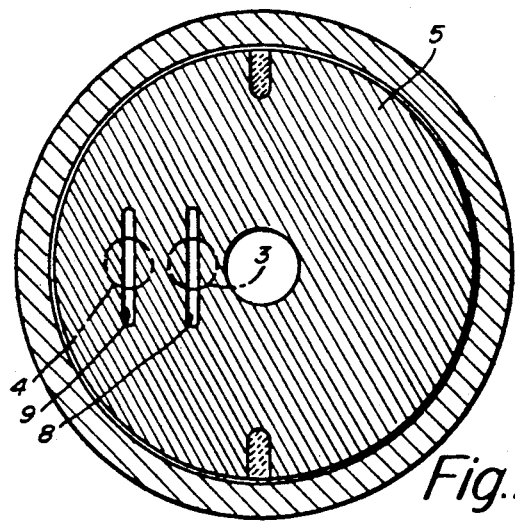
FIG. 2 is a cross-sectional view taken along line 2—2 of FIG. 1 showing further details in particular of the aperture plate.
Figure 3:
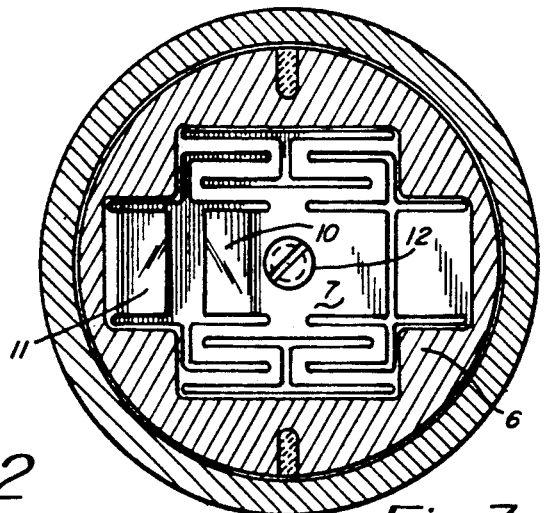
FIG. 3 is a cross-sectional view taken along line 3—3 of FIG. 1 showing further details in particular of the metal flexure plate and spacer plate.

Now, with respect to the embodiment of the invention illustrated in FIGS. 1-3 herein, the optical pressure transducer is considered as being comprised of a body 1 that is preferably constructed of a rigid metal and a force summing diaphragm 2. As noted in FIG. 1, the arrows 21 illustrate the direction in which pressure is applied to the diaphragm 2. It is this pressure that is being sensed by the optical pressure transducer of the invention.

The diaphragm 2 may be constructed of a metal material. Examples of material include stainless steel or a nickel chromium iron alloy. The diaphragm 2 may be welded to the transducer body 1 such as by means of electron beam welding. This is illustrated in FIG. 1 at 22.

Within the body 1 are disposed the optical fibers 3 and 4. FIG. 1 illustrates these optical fibers extending through the body 1. The optical fibers include an input optical fiber 3 which at its top end receives light from a light source such as the illustrated light emitting diode 3A. The lower end of the optical fiber 3 is secured in position flush with the lower end face of the body 1. This is along a plane that is the plane where at the cross section 2—2 is taken in FIG. 1.

The output optical fiber 4 at its lower end is also disposed in a fixed manner at this same plane. The top end of the fiber 4 is positioned so as to direct output light to a photosensitive element such as the illustrated photodiode 4A.

The transducer body 1 is also provided with a centrally disposed passage 23. This passage is adapted to receive a member such as a screwdriver 4 turning the adjusting screw 12. This operation is discussed in further detail hereinafter.

In FIG. 1, a broken arrow 25 illustrates an optical path between the fibers 3 and 4. It is this optical path that is interrupted by the reflectors 10 and 11 to be described in further detail hereinafter. This optical path is controlled by a certain masking plate, also identified herein as the aperture plate 5 illustrated in, for example, FIGS. 1 and 2. This aperture plate 5 includes slot like apertures 8 and 9. The light emanating from the sensor end of the input optical fiber 3 is masked by an input aperture 8 which modifies the light intensity pattern coming from the optical fiber 3. This pattern is reflected down onto the moveable reflector 10 which is connected to the force summing diaphragm 2, by means of the adjusting screw 12.

The modified intensity pattern (optical path 25) is reflected from the moveable reflector 10 to the fixed reflector 11 and from there through the output aperture 9 into the output optical fiber 4. The output aperture 9 blocks a proportional amount of the modified intensity pattern preventing it from entering the output optical fiber 4. The initial amount blocked from the end of the output optical fiber 4 is determined by the initial vertical position of the moveable reflector 10. Application of pressure to the face of the diaphragm 2 causes the moveable reflector 10 to displace vertically changing the proportional amount of the modified intensity pattern entering the receiving end of the output optical fiber 4. This change is detected at the output end of the output optical fiber 4 by a photosensitive device such as the illustrated photodiode 4A.

As indicated previously, upon application of pressure to the diaphragm 2, the moveable reflector 10 is displaced. This is illustrated in, for example, FIG. 5. The initial position of the moveable reflector 10 is shown in phantom outline, while the displaced position of the moveable reflector 10 is shown in solid outline. A comparison between FIGS. 4 and 5 clearly illustrates the manner in which the proportional amount of the intensity pattern is permitted to either be blocked or passed to the output optical fiber 4.

Figure 4:
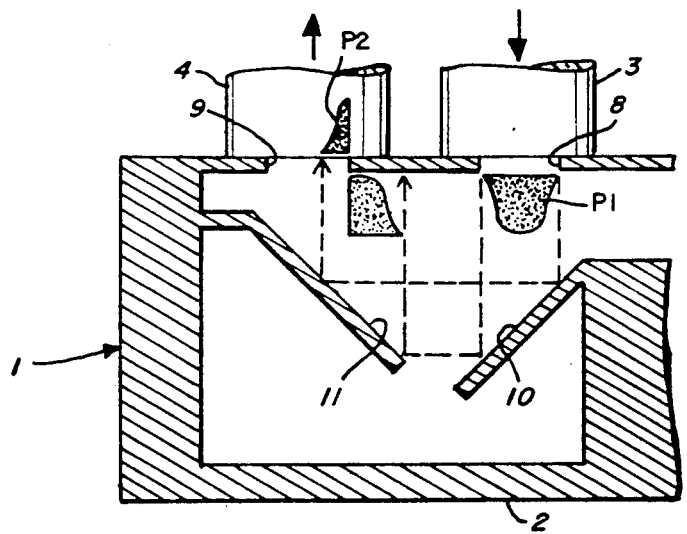
FIG. 4 is a partial cross-sectional view of the optical path in the rest position of the pressure responsive diaphragm.
Figure 5:
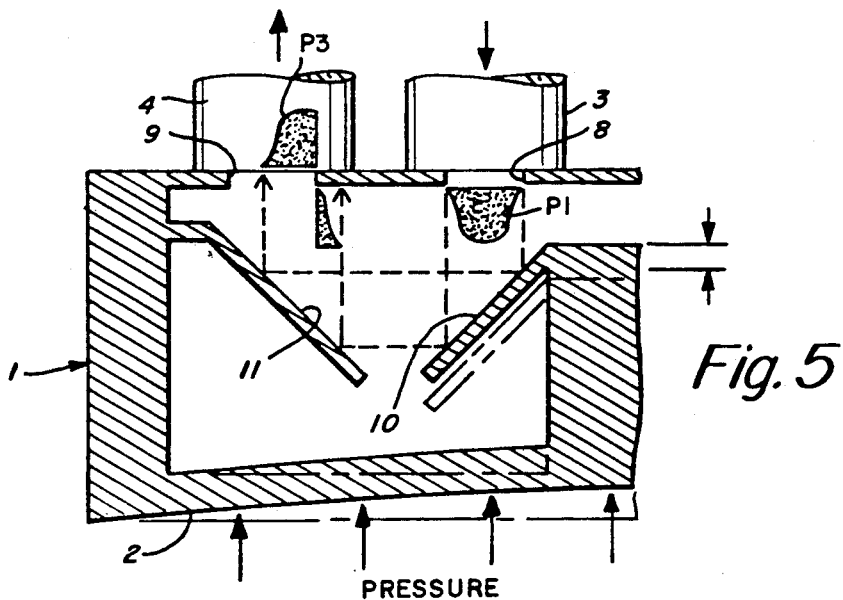
FIG. 5 is a fragmentary cross-sectional view similar to that illustrated in FIG. 4 but showing somewhat by exaggeration the position of the reflectors upon deflection of the diaphragm.

For example, in FIG. 4 there is a far smaller proportion of the reflected signal that enters the optical fiber 4. In FIG. 5, on the other hand, there is a substantially larger proportion of the signal that is passed into the output optical fiber 4.

The optical fibers 3 and 4 may each be a metal coated silica clad, silica core, multi mode, stepped index optical fiber. These optical fibers may be epoxied into holes provided in the transducer body using a high temperature (600° C.) epoxy. The ends of the optical fibers 3 and 4 and a front face of the body 1 are polished to a mirror finish, along the plane defined by the cross-section 2—2 in FIG. 1. This provides a smooth mounting surface and flat optically clear fiber ends. The smooth mounting surface is for receiving a series of plates and defining, for example, the apertures and reflectors. These various plates are illustrated in FIGS. 2, 3, and 9.

FIG. 2 illustrates the aperture plate 5. This may be a photochemically etched metal aperture plate which is placed on the polished surface of the body in a fashion to ensure the alignment of the two apertures 8 and 9 with relationship to the optical fibers 3 and 4. This position is illustrated in FIG. 2. Once the aperture plate 5 is in position, then it may be resistance welded to the transducer body 1.

Next, there is provided a photochemically etched metal spacer plate 6. This is illustrated in FIG. 3. This is also aligned with the aperture plate 5 and is resistance welded thereto. Alignment tabs, holes or the like may be provided for proper alignment of these various plates.

Figure 9:
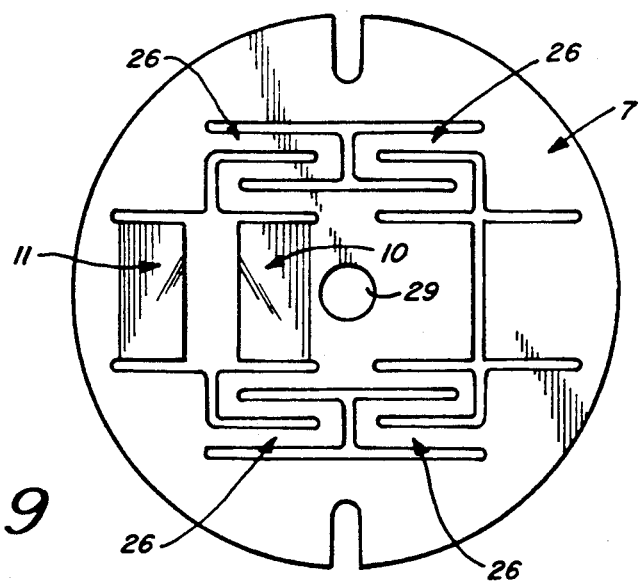
FIG. 9 is a plan view of the specific construction of the reflector plate as in accordance with the disclosed embodiment herein.

Next, reference is made to FIG. 9 which illustrates a plan view of the formed metal flexure plate. This is a photochemically etched plate that has a reflective coating thereon. Again, this plate is aligned in a manner so that the moveable reflector 10 and the fixed reflector 11 are aligned parallel to the apertures 8 and 9 in the aperture plate 5. The flexure plate 7 is then resistance welded to the spacer plate 6. Reference is made hereinafter to further details of the flexure plate 7, particularly as it relates to the operation of the adjusting screw 12.

In the transducer illustrated in FIG. 1, at the tops of the fibers 3 and 4 the ends of the fibers may be cleaved at the appropriate length, polished if required, and inserted into a standard source and standard detector for a functional check. With the aid of the standard source/detector, the course offset adjustment screw 12 with a small amount of high temperature epoxy disposed on the threads thereof is adjusted to set the initial vertical position of the moveable reflector 10 to achieve an appropriate output setting from the standard source/detector with its associated electronics. The epoxy on the course offset adjustment screw 12 is allowed to cure to hold the screw 12 in place.

Figure 6:
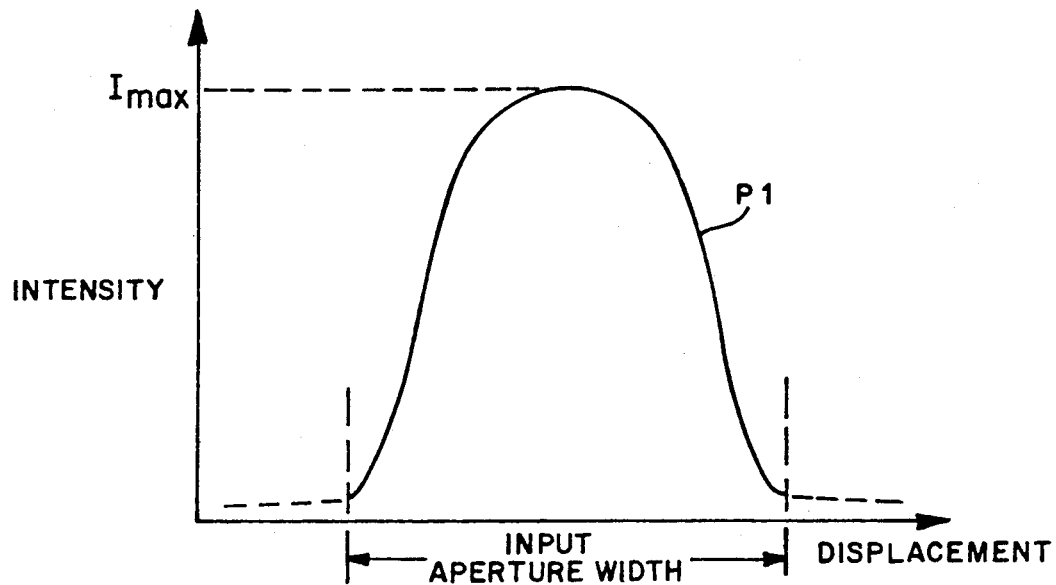
FIG. 6 illustrates the input light intensity pattern.

Now, with regard to FIG. 6, there is illustrated therein an input intensity pattern P 1 that exits from the input optical fiber through the input aperture 8. As also illustrated in FIG. 4, the input intensity pattern P-1 is the one that is at the output of the aperture 8 and is the pattern that is directed to the moveable reflector 10.

Figure 7:
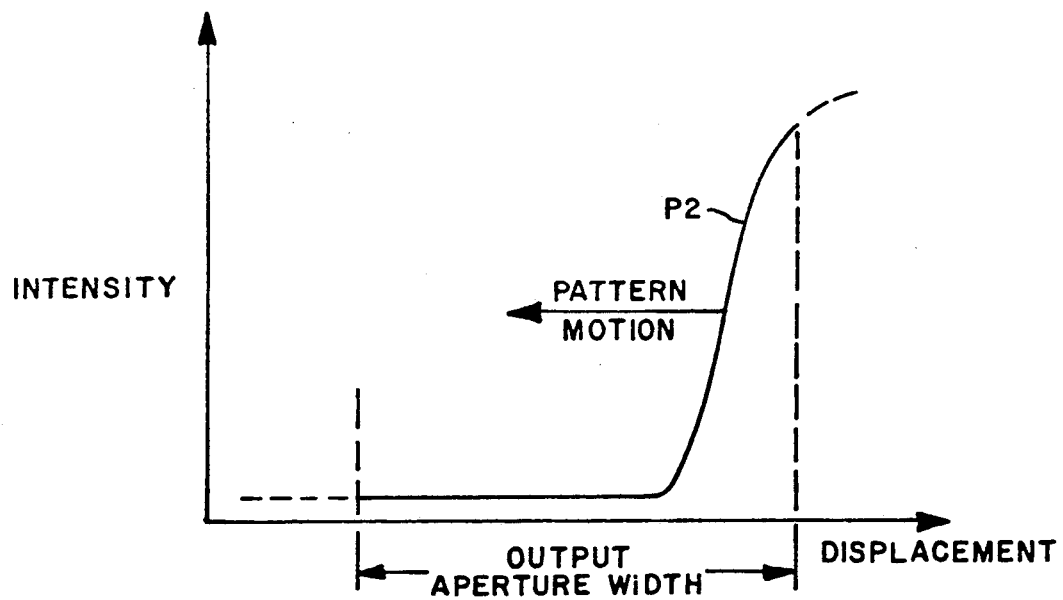
FIG. 7 illustrates the output intensity light pattern.

FIG. 7 shows the proportional amount of the modified intensity pattern that couples through the output aperture 9 and enters the output optical fiber 4 after the appropriate course offset adjustment screw setting has been made. In FIG. 4, for a normal rest position of the diaphragm this is illustrated as the intensity pattern P-2. Also refer to FIG. 7.

In operation, the unmodified light intensity pattern emitted from the light source travels through the input optical fiber 3 to the input aperture 8 exiting as the modified intensity pattern illustrated in FIGS. 4 and 6. This intensity pattern is reflected down onto the moveable reflector 10 and across to the fixed reflector 11 and from there up to the output aperture 9. The output aperture 9 masks an appropriate proportion of the modified intensity pattern as shown in FIGS. 4 and 7, for example, and, therefore, the amount of light entering the output optical fiber 4 is masked.

Vertical displacement of the moveable reflector 10, as illustrated in FIG. 5, proportionally increases the amount of light intensity pattern entering the output optical fiber 4, and, thus, also the amount of light that is coupled to the photodetector 4A. The initial vertical position and the range of the vertical displacement of the moveable reflector 10 is selected so that the minimum non linearity of the modified intensity pattern is achieved. This occurs symmetric to the central peak of the modified intensity pattern. In this regard, refer to FIG. 5 for an illustration of the proportional increase in the intensity pattern, identified in FIG. 5 as a pattern P-3 exiting into the output optical fiber 4.

As illustrated in FIGS. 3 and 9, the reflector plate 7 is constructed so that the moveable reflector 10 is attached to the fixed peripheral portion of the plate 7 by means of integral S-shaped flexures 26. There are four such S-shaped flexures illustrated in FIG. 9. These flexures provide support for and permit parallel motion of the moveable reflector 10 in a direction perpendicular to the plane of the plate 7.

During the assembly process, the S-shaped flexures 26 are deformed slightly, at the attachment points on the fixed portion of plate 7, biasing the position of the moveable reflector plate towards the aperture plate 5.

Figure 11:
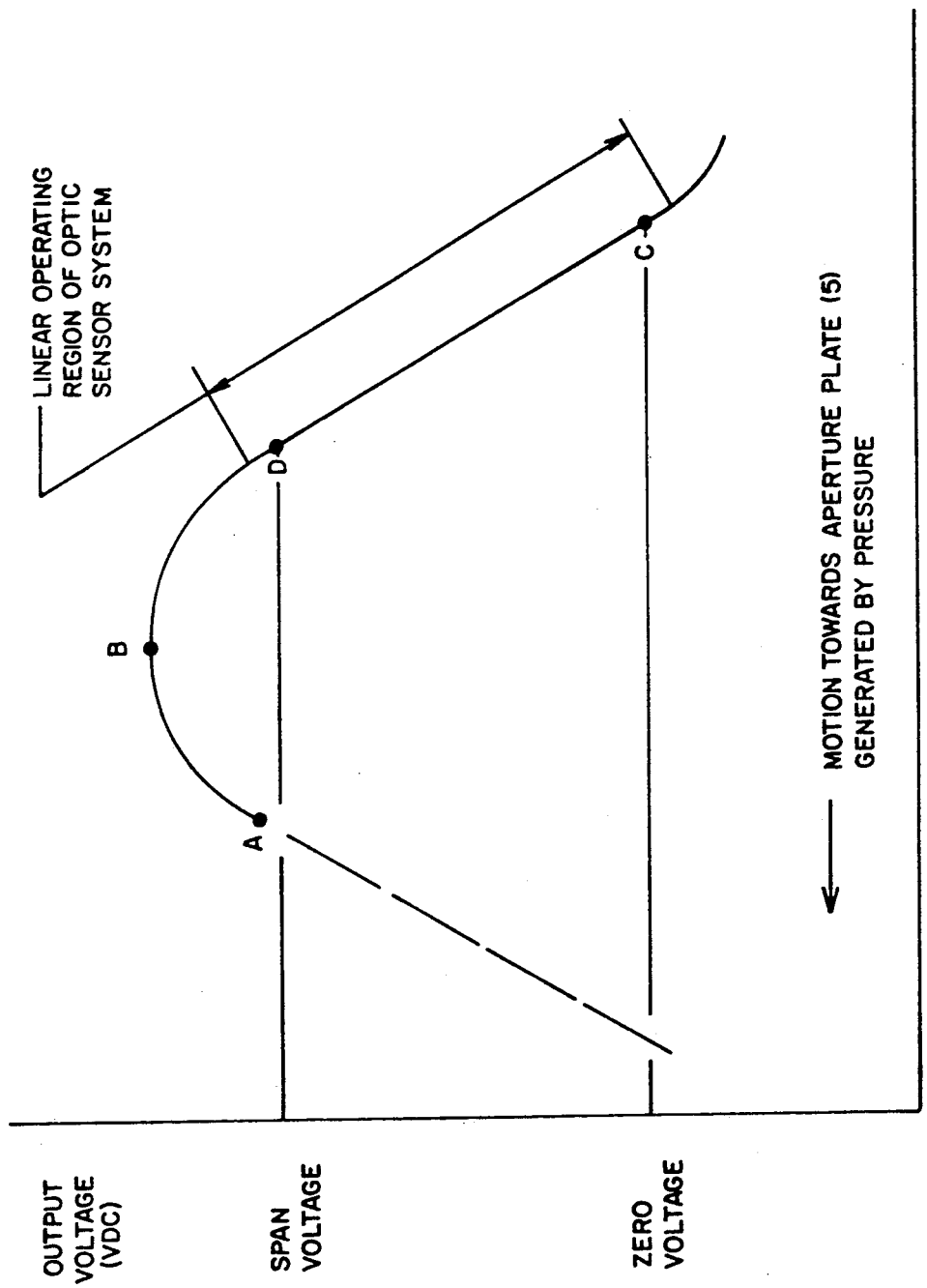
FIG. 11 is a plot of output voltage versus deflection used in explaining the adjustments made in accordance with the transducer of the present invention.

Now, reference is made to FIG. 11 for an illustration of the characteristic conditioned (photosensitive device and associated electronics) DC (direct current) voltage output curve, as a function of the moveable reflector displacement. A clockwise adjustment (tightening) of the calibration screw 12 engages the screw into the threads of the post 28. Then, the bottom of the screw head engages the base of the moveable reflector 10 (the area around the clearance hole 29), indicated as point A on the operating curve.

Continuous clockwise adjustment of the calibration screw 12 gradually moves the moveable reflector 10 towards the diaphragm 2 generating tension in the S-shaped flexures 26. This forces the base of the moveable reflector 10 up against the bottom of the screw head as illustrated in FIG. 1.

As indicated previously, the high temperature epoxy is applied to the screw threads as well as the underside of the screw head prior to insertion through the clearance hole 29 in the moveable reflector 10 and engagement with the threads in the diaphragm post 28. Also, when the epoxy cures, it locks the screw in the diaphragm post as well as locking the moveable reflector 10 to the underside of the screw head.

Before the epoxy cures, however, the calibration screw 12 is adjusted clockwise varying the output voltage through point B in the curve of FIG. 11 (corresponding to the position where the base of the moveable reflector 10 and the base of the fixed reflector 11 are co planer, yielding the maximum voltage output) to point C, the course 0 pressure setpoint. point C or 0 pressure voltage output, falls at the bottom end of the linear voltage output to deflection operating range of the optical sensor, and is the closest position of the moveable reflector 10 to the diaphragm post. Again, in FIG. 11 note the linear range between points C and D on the curve.

It is furthermore to be noted that the tension generated by the S-shaped flexures 26 on the calibration screw 12 transmitted to the diaphragm post and diaphragm 2 is small in comparison to the opposing force generated by the diaphragm itself.

After the epoxy on the screw 12 cures, this locks the moveable reflector 10 at a position indicated by point C on the operating curve. Pressure generated deflection (deflection fixed for all pressure ranges at $0.001 + 0.0002$ inches) of the highly elastic metal diaphragm 2, towards the aperture plate 5, causes the moveable reflector 10 to move toward the aperture plate 5 to a position shown as point D on the operating curve, or span (full scale) voltage output. Release of pressure returns the moveable reflector 10 to the initial starting position shown as point C on the operating curve.

Accordingly, by proper adjustment of the screw 12, the position of the moveable reflector plate is set up so that it can carry out a full range of pressure detection. Furthermore, this range, as noted by the diagram of FIG. 11, is a linear proportional range.

Figure 8:
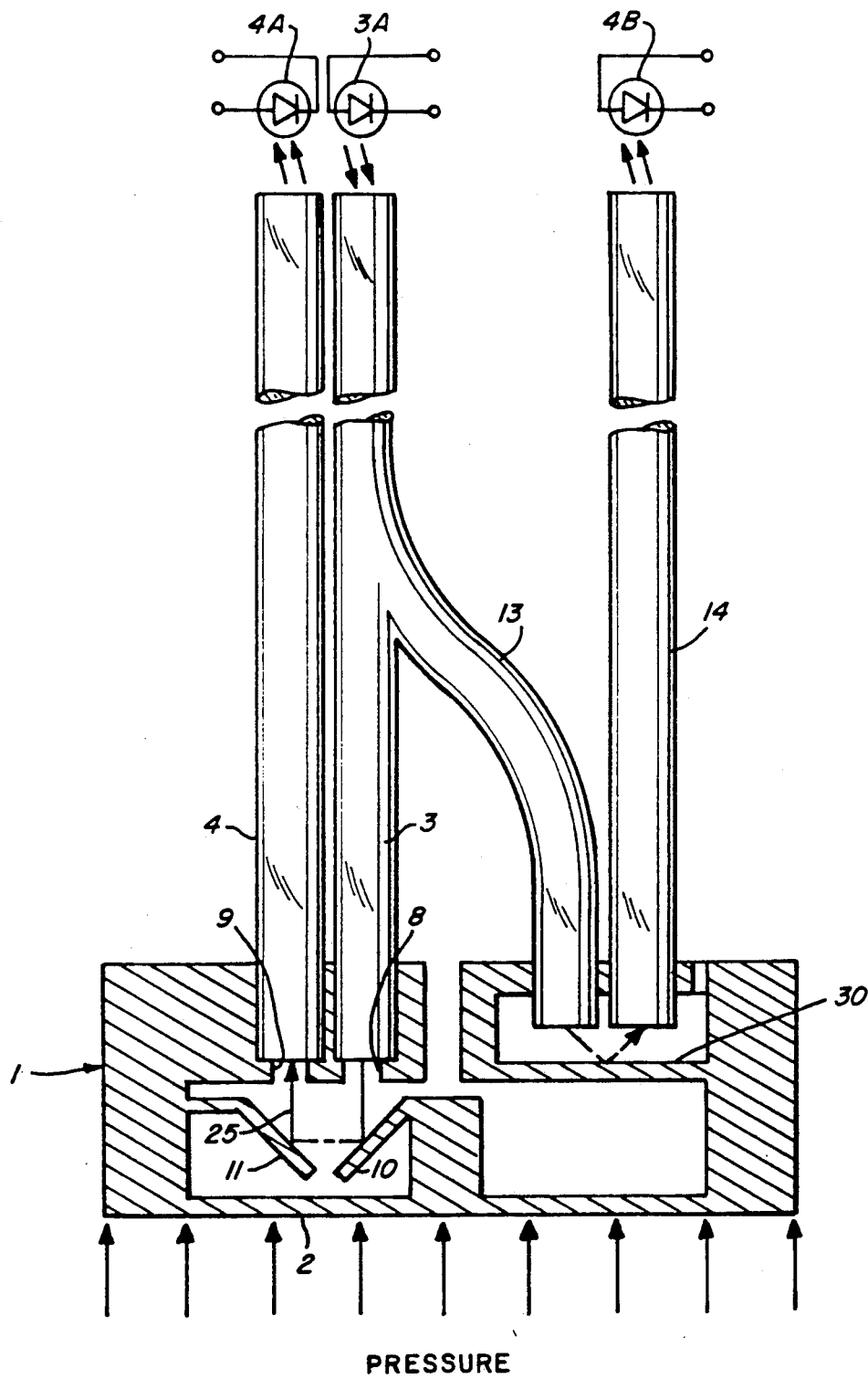
FIG. 8 illustrates a second embodiment of the present invention employing a transducer construction with main optical path similar to that illustrated in FIG. 1 but also including a further reference portion of the transducer.

Reference is now made to FIG. 8 for an alternate embodiment of the present invention. In FIG. 8, like reference characters are used to identify parts previously associated with the first embodiment of the invention such as the one illustrated in FIG. 1. Thus, in the embodiment of FIG. 8 there is illustrated the optical fibers 3 and 4 as well as the reflectors 10 and 11. However, in this embodiment the input optical fiber is divided to form a bifurcated fiber that also includes essentially a separate input optical fiber 13. This bifurcated input optical fiber 13 carries a portion of the input unmodified intensity pattern which is directed to a fixed surface 30 of the transducer body 1. This light is reflected from this surface 30 into a second reference output optical fiber 14. A proportional amount of the reflected light is detected at the output end of the reference optical fiber 14 by a photosensitive device such as the illustrated photodiode 4B. The combination of the light source, bifurcated input optical fiber 13, and fixed reflective surface 30 provide a feedback arrangement for controlling certain detection signals associated with the transducer. This feedback arrangement coupled to the conditioning electronics (not shown) minimizes signal errors externally induced by microbending of the optical fibers, and temperature induced dimensional changes in the mechanics of the transducer body 1.

Figure 10:
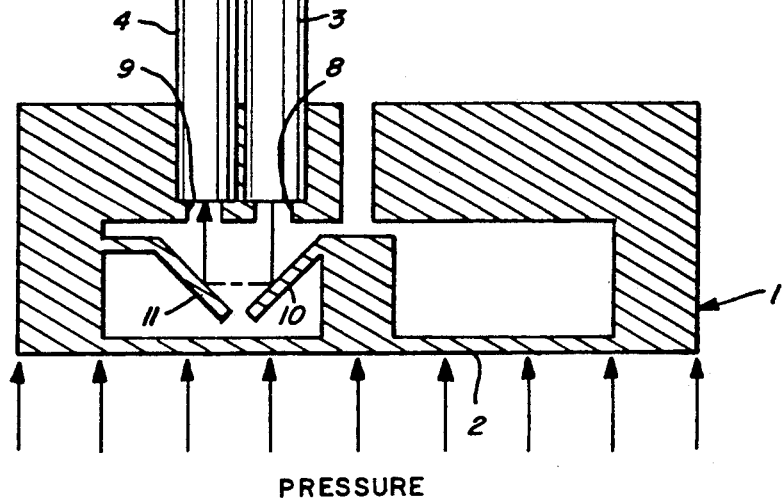
FIG. 10 illustrates a third embodiment of the present invention.

FIG. 10 illustrates still a further embodiment of the present invention. Again, in FIG. 10 the same reference characters are used to identify similar parts previously described in association with FIGS. 1 and 8 In the embodiment of FIG. 10, the input optical fiber 3 is also divided to form a bifurcated input/output optical fiber 33. This bifurcated input/output optical fiber 33 carries a portion of the unmodified intensity pattern from the light source directly to a second photosensitive device such as the illustrated photodiode 4C. The combination of the input optical fiber, the bifurcated fiber and the additional photosensitive device provide a feedback arrangement to the conditioning electronics to minimize signal errors due to light source drift with time/temperature and photosensitive device thermal effects. Microbending of the fiber is not addressed in this particular configuration.

Having now described a limited number of embodiments of the present invention, it should now be apparent to those skilled in the art the numerous other embodiments and modifications thereof are contemplated as falling within the scope of the present invention as defined by the appended claims.

What is claimed is:

1. A pressure transducer comprising; a body, an input optical fiber, said body having means for receiving said input optical fiber, an output fiber, said body having means for receiving said output optical fiber, a force responsive diaphragm, means securing the diaphragm to the body at a position adjacent the optical fibers, a fixed position reflector, means positioning the fixed position reflector in the optical path defined between said input and output optical fibers, a moveable reflector, and means securing the moveable reflector to said diaphragm to be responsive to deflection thereof and positioned to move with movement of the diaphragm primarily only in a direction substantially aligned with the optical axis of at least one of the optical fibers so as to couple different proportional amounts of reflected light, in said optical path between said input and output optical fibers.

2. A pressure transducer as set forth in claim 1 wherein said input and output optical fibers are disposed in relative juxtaposition with ends thereof in the optical path disposed in a common plane.

3. A pressure transducer comprising; a body, an input optical fiber, said body having means for receiving said input optical fiber, an output optical fiber, said body having means for receiving said output optical fiber, a force responsive diaphragm, means securing the diaphragm to the body at a position adjacent the optical fibers, a fixed position reflector having a reflecting surface in line with the axis of said output optical fiber, means positioning the fixed position reflector in the optical path defined between said input and output optical fibers, a moveable reflector, and means securing the moveable reflector to said diaphragm to be responsive to deflection thereof and positioned in said optical path between said input and output optical fibers wherein said fixed reflector has a reflecting surface in line with the axis of said output optical fiber.

4. A pressure transducer as set forth in claim 3 wherein said moveable reflector has a reflecting surface in line with the axis of said input optical fiber.

5. A pressure transducer as set forth in claim 4 wherein said fixed and moveable reflectors are disposed at a relative position on the order of 90° to each other.

6. A pressure transducer as set forth in claim 5 wherein said moveable reflector is supported at about the central axis of said diaphragm by an adjusting member.

7. A pressure transducer as set forth in claim 6 including a light source for establishing an optical signal in said input optical fiber for direction to said moveable reflector.

8. A pressure transducer as set forth in claim 7 including an optical detector for detecting an optical signal from said output optical fiber as reflected from said fixed reflector and directed into said output optical fiber.

9. A pressure transducer as set forth in claim 8 including means defining predetermined optical restricting apertures of the respective fibers and disposed at said common plane.

10. A pressure transducer comprising; a body, an input optical fiber, said body having means for receiving said input optical fiber, an output optical fiber, said body having means for receiving said output optical fiber, a force responsive diaphragm, means securing the diaphragm to the body at a position adjacent the optical fibers, a fixed position reflector, means positioning the fixed position reflector in the optical path defined between said input and output optical fibers, a moveable reflector, means securing the moveable reflector to said diaphragm to be responsive to deflection thereof and positioned in said optical path between said input and output optical fibers, an aperture plate secured to the face of said body at a common plane, said aperture plate having means defining an input aperture in alignment with the input optical fiber and an output aperture, in alignment with the output optical fiber.

11. A pressure transducer as set forth in claim 10 including a reflector plate disposed over said aperture plate and having metal pieces defining said fixed and moveable reflectors.

12. A pressure transducer as set forth in claim 11 wherein said reflector plate includes S-shaped flexures interconnecting the moveable reflector and the fixed periphery of the reflector plate.

13. A pressure transducer as set forth in claim 10 further comprising an adjusting means for adjusting the position of said moveable reflector relative to said diaphragm.

14. A pressure transducer comprising; a body, an input optical fiber, said body having means for receiving said input optical fiber, an output optical fiber, said body having means for receiving said output optical fiber, a force responsive diaphragm, means securing the diaphragm to the body at a position adjacent the optical fibers, a fixed position reflector, means positioning the fixed position reflector in the optical path defined between said input and output optical fibers, a moveable reflector, and means securing the moveable reflector to said diaphragm to be responsive to deflection thereof and positioned in said optical path between said input and output optical fibers wherein said input optical fiber is bifurcated to provide a separate input optical fiber.

15. A pressure transducer as set forth in claim 14 including a reference reflector surface and a second output optical fiber, said reference reflector surface being a fixed surface of the body disposed in the optical path between the separate input optical fiber and the second output optical fiber.

16. A pressure transducer as set forth in claim 15 including a photosensitive device disposed in the optical path of said second output optical fiber.

17. A pressure transducer as set forth in claim 14 wherein said moveable reflector is disposed in a manner to move with movement of the diaphragm substantially in the direction of the optical axis of at least one of the optical fibers so as to couple different proportional amounts of reflected light.

18. A pressure transducer as set forth in claim 17 wherein said moveable reflector has a reflecting surface in line with the axis of said input optical fiber.

19. A pressure transducer as set forth in claim 14 further comprising an adjustment means for adjusting the position of said moveable reflector relative to said diaphragm.

20. A pressure transducer as set forth in claim 14 wherein said separate input optical fiber carries a portion of an input light source directly to a photosensitive device.

21. An optical transducer comprising a body and associated diaphragm, said body and diaphragm defining therebetween an optical sensing space, means defining an optical path at least in part extending into said space, said optical path defined by a plurality of optical fibers, said optical path having associated therewith means for establishing a light intensity pattern and means for detecting a modified light intensity pattern, a fixed position reflector means disposed in the optical path, a moveable reflector means disposed in the optical path, and means for securing the moveable reflector means to said diaphragm to move with movement of the diaphragm primarily only in a direction substantially aligned with the optical axis of at least one of the optical fibers so as to couple different proportional amounts of reflected light.

22. An optical transducer as set forth in claim 21 wherein said means for securing the moveable reflector includes means for securing the moveable reflector to the center axis of said diaphragm.

23. An optical transducer as set forth in claim 21 including means defining a first aperture for controlling the light pattern directed to the moveable reflector and means defining a second aperture for receiving the light reflected from the fixed reflector.

24. An optical transducer comprising a body and associated diaphragm, said body and diaphragm defining therebetween an optical sensing space, means defining an optical path at least in part extending into said space, said optical path defined by a plurality of optical fibers, said optical path having associated therewith means for establishing a light intensity pattern and means for detecting a modified light intensity pattern, a fixed position reflector means disposed in the optical path, a moveable reflector means disposed in the optical path, and means for securing the moveable reflector means to said diaphragm, wherein said moveable reflector is disposed in a manner for movement with said diaphragm in a direction orthogonal to the plane of the face of the diaphragm so as to couple different proportional amounts of the intensity pattern as reflected from the fixed reflector to the associated output aperture.

25. An optical transducer comprising a body and associated diaphragm, said body and diaphragm defining therebetween an optical sensing space, means defining an optical path at least in part extending into said space, said optical path having associated therewith means for establishing a light intensity pattern and means for detecting a modified light intensity pattern, a fixed position reflector means disposed in the optical path, a moveable reflector means disposed in the optical path; means for securing the moveable reflector means to said diaphragm; and adjusting means for adjusting the position of said moveable reflector relative to said diaphragm.

26. A method of constructing an optical transducer having a diaphragm and including the steps of, providing a body, providing juxtapositioned passages in the body, inserting optical input and output fibers in these passages so that the ends thereof are substantially flush with the face of the body, providing fixed and moveable reflectors, defining an optical path between the input and output optical fibers, positioning the fixed and moveable reflectors in a series arrangement and affixing said moveable reflector to said diaphragm such that the moveable reflector moves in response to diaphragm deflection in the optical path between the input and output optical fibers.

27. A method as set forth in claim 26 including adjusting the position of the moveable reflector relative to the diaphragm of the transducer.

28. A pressure transducer comprising; a body, an input optical fiber, said body having means for receiving said input optical fiber, an output optical fiber, said body having means for receiving said output optical fiber, a force responsive diaphragm, means securing the diaphragm to the body at a position adjacent the optical fibers, a fixed position reflector, means positioning the fixed position reflector in the optical path defined between said input and output optical fibers, a moveable reflector, means supporting said moveable reflector from said diaphragm and including an adjusting member for adjusting the position of said moveable reflector relative to said diaphragm.

29. A pressure transducer as set forth in claim 28 wherein said moveable reflector is disposed in line with an optical axis of one of the optical fibers such that the moveable reflector will move with movement of the diaphragm substantially in the direction of the optical axis so as to couple different amounts of reflected light proportional to said movement.

30. The pressure transducer of claim 29 wherein said fixed reflector has a reflecting surface in line with the axis of said output optical fiber.

31. The pressure transducer as set forth in claim 29 wherein said moveable reflector has a reflecting surface in line with the axis of said input optical fiber.

32. A pressure transducer comprising; a body, an input optical fiber, said body having means for receiving said input optical fiber, an output optical fiber, said body having means for receiving said output optical fiber, a force responsive diaphragm having a face onto which pressure is applied, means securing the diaphragm to the body at a position adjacent the optical fibers, a fixed position reflector, means positioning the fixed position reflector in the optical path defined between said input and output optical fibers, a moveable reflector disposed in a manner to move with movement of the diaphragm in a direction substantially orthogonal to the plane of the face of the diaphragm, means securing the moveable reflector to said diaphragm to be responsive to deflection thereof and position in said optical path between said input and output optical fibers, an aperture plate secured to said body, said aperture plate having means defining an input aperture and an output aperture disposed between said optical fibers and said reflectors.

33. A pressure transducer as set forth in claim 32 wherein the aperture plate is secured to said body at a common plane.

34. A pressure transducer of claims 32 or 33 further comprising an adjusting means for adjusting the position of said moveable reflector relative to said diaphragm.

35. A pressure transducer comprising; a body, an input optical fiber, said body having means for receiving said input optical fiber, an output optical fiber, said body having means for receiving said output optical fiber, a force responsive diaphragm, means securing the diaphragm to the body at a position adjacent the optical fibers, a fixed position reflector, means positioning the fixed position reflector in the optical path defined between said input and output optical fibers, a moveable reflector, and means securing the moveable reflector to said diaphragm to be responsive to deflection thereof and positioned in said optical path between said input and output optical fibers; and means for adjusting the position of said moveable reflector relative to said diaphragm.

36. An optical pressure transducer comprising; a body, an input optical fiber, said body having means for receiving said input optical fiber, an output optical fiber, said body having means for receiving said output optical fiber, a force responsive diaphragm said diaphragm having a face onto which pressure is applied, means securing the diaphragm to the body at a position adjacent the optical fibers, a fixed position reflector, means positioning the fixed position reflector in the optical path defined between said input and output optical fibers, said optical path having associated therewith means for establishing a light intensity pattern, a moveable reflector, means securing the moveable reflector to said diaphragm to be responsive to deflection thereof and positioned in said optical path between said input and output optical fibers, wherein said moveable reflector is disposed in a manner to move with movement of the diaphragm primarily only in a direction substantially orthogonal to the plane of the face of the diaphragm so as to couple different proportional amounts of the intensity pattern as reflected from the fixed reflector to the associated output fiber.

37. An optical transducer as set forth in claim 36 including adjusting means for adjusting the position of said moveable reflector relative to said diaphragm.

38. A method of constructing an optical transducer including the steps of, providing a body, providing juxtapositioned passages in the body, inserting optical input and output fibers in these passages, providing a force responsive diaphragm, providing means securing the diaphragm to the body at a position adjacent to the optical fibers, providing fixed and moveable reflectors, said moveable reflector disposed in a manner to move with movement of the diaphragm primarily only in a direction substantially aligned with the direction of the optical axis of at least one of said optical fibers defining an optical path between the input and output optical fibers, and positioning the fixed and moveable reflectors in a series arrangement in the optical path between the input and output optical fibers.

39. The method of claim 38, further comprising providing an adjusting means for adjusting the position of said moveable reflector relative to said diaphragm.

40. The method as set forth in claims 38 or 39, further comprising providing means defining a first aperture for controlling the light pattern directed to the moveable reflector and providing means defining a second aperture for receiving the light reflected from the fixed reflector.

41. A method of constructing an optical transducer including the steps of, providing a body, providing juxtapositioned passages in the body, inserting optical input and output fibers in the passages, wherein at least one of said input fibers is bifurcated to provide a separate input optical fiber, providing a force responsive diaphragm, providing means securing the diaphragm to the body at a position adjacent to the optical fibers, providing fixed and moveable reflectors, said moveable reflector disposed in a manner to move with movement of the diaphragm in a direction substantially aligned with the direction of the optical axis of at least one of said optical fibers defining an optical path between the input and output fibers, and positioning the fixed and moveable reflectors in a series arrangement in the optical path between the input and output optical fibers.

42. The method as set forth in claim 41, further comprising providing an adjusting means for adjusting the position of said moveable reflector relative to said diaphragm.

43. The method as set forth in claims 41 or 42, further comprising providing means defining a first aperture for controlling the light pattern directed to the moveable reflector and providing means defining a second aperture for receiving the light reflected from the fixed reflector.

44. A pressure transducer comprising; a body, an input optical fiber, said body having means for receiving said input optical fiber, an output optical fiber, said body having means for receiving said output optical fiber, a force responsive diaphragm, means securing the diaphragm to the body at a position adjacent the optical fibers, a fixed position reflector, means positioning the fixed position reflector in the optical path defined between said input and output optical fibers, a moveable reflector, means securing the moveable reflector to said diaphragm to be responsive to deflection thereof and positioned in said optical path between said input and output optical fibers, an aperture plate secured to the face of said body, said aperture plate having means defining an input aperture and an output aperture, said apertures disposed between said optical fibers and said reflectors.

45. An optical transducer comprising a body and associated diaphragm, said body and diaphragm defining therebetween an optical sensing space, means defining an optical path at least in part extending into said space, said optical path defined by a plurality of optical fibers, a fixed position reflector means disposed in the optical path, a moveable reflector means disposed in the optical path, and means for securing the moveable reflector means to said diaphragm at substantially a single point securing area of the diaphragm.

46. An optical transducer as set forth in claim 45 wherein said means for securing the moveable reflector supports the moveable reflector so that it has a free end disposed in the optical path in alignment with one of the optical fibers.

47. An optical transducer comprising a body and associated diaphragm, said body and diaphragm defining therebetween an optical sensing space, means defining an optical path at least in part extending into said space, said optical path defined by a plurality of optical fibers, a fixed position reflector means disposed in the optical path, a moveable reflector means disposed in the optical path, and means for securing the moveable reflector means to said diaphragm to provide a free end of the moveable reflector means in the optical path substantially in alignment with the optical axis of one of the optical fibers.

48. An optical transducer comprising a body and associated diaphragm, said body and diaphragm defining therebetween an optical sensing space, means defining an optical path at least in part extending into said space, said optical path defined by a plurality of optical fibers, a fixed position reflector means disposed in the optical path, means supporting the diaphragm so that the diaphragm extends fully across the optical path overlying both optical fibers, and means for securing the moveable reflector means to said diaphragm at a position adjacent one of said optical fibers.

49. An optical transducer comprising a body and associated diaphragm, said body and diaphragm defining therebetween an optical sensing space, means defining an optical path at least in part extending into said space, said optical path defined by a plurality of optical fibers, a fixed position reflector means disposed in the optical path, a moveable reflector means disposed in the optical path, said moveable reflector means being fixed to said diaphragm such that the moveable reflector moves in response to diaphragm deflection both said fixed and moveable reflector means having like reflective surfaces.

50. An optical transducer as set forth in claim 49 wherein said optical path is absent any optical grating surface.

* * * * *